E. Bascom,
Astronomical Globe.

Nº 58,757. Patented Oct. 16, 1866.

Witnesses:
L. Luchs
J. Goetz

Inventor
Elias Bascom
By his Atty.
J Franklin Reigart

UNITED STATES PATENT OFFICE.

ELIAS BASCOM, OF NEW YORK, N. Y.

IMPROVEMENT IN GLOBES.

Specification forming part of Letters Patent No. 58,757, dated October 16, 1866.

*To all whom it may concern:*

Be it known that I, ELIAS BASCOM, of the city of New York and State of New York, have invented new and useful Improvements in Terrestrial and Celestial Globes; and I do hereby declare the following to be an exact description thereof, reference being had to the accompanying drawings, and to the letters of reference marked thereon, making a part of this specification.

The nature of my invention consists in illuminating a transparent globe, made of any transparent material, by means of an illuminating axis or light in the center, around which the globe will revolve, in combination with hoops or wires that will represent the lines of latitude, at the same time give the proper shape to the globe, and allow it to be easily folded together for transportation; also, its bearings at the poles with apertures for air to regulate the draft and prevent any heat or smoke from injuring the globe.

Figure 1:
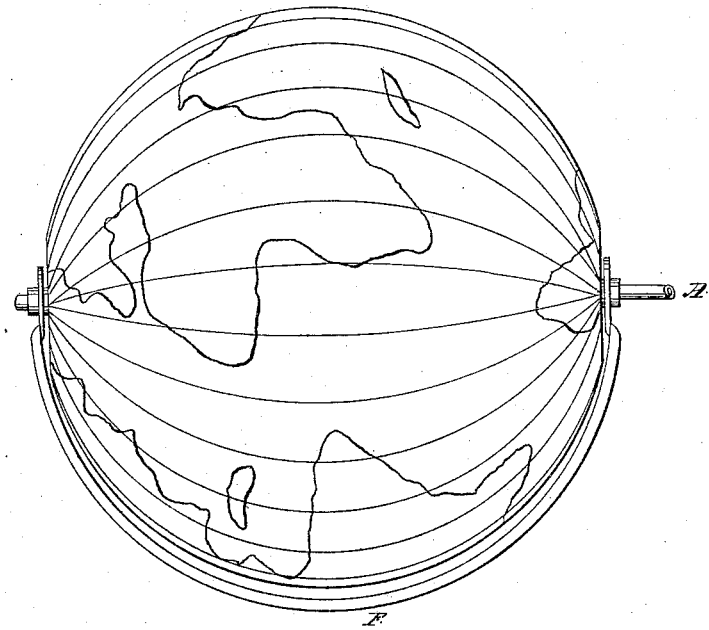
Figure 2:
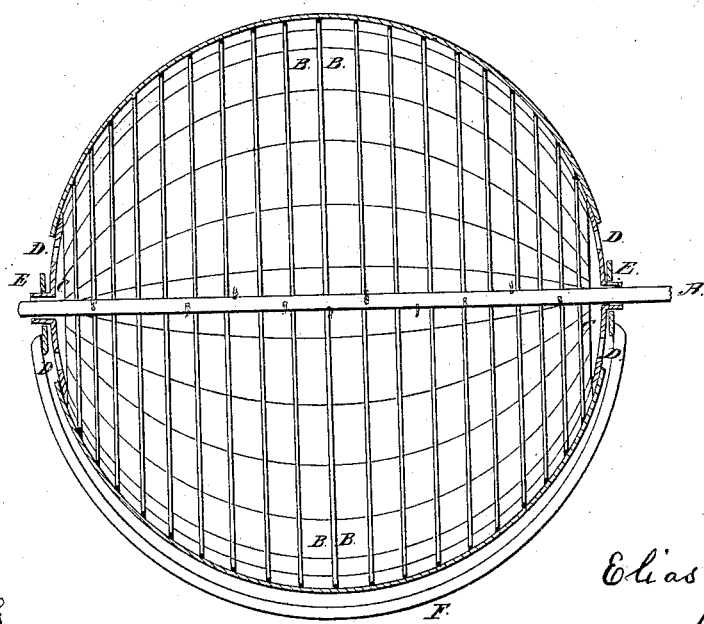

Figure 1 represents either a terrestrial or celestial globe as expanded by wires or hoops extending latitudinally, while its axis is an illuminating-axis by a lamp, candle, or gas, around which the globe revolves. Fig. 2 is a cross-section of the globe, showing the latitudinal wires and the illuminating-axis in the center; also the bearings at the ends.

A represents the illuminating-axis, over which the globe is placed and then lighted; B B, the hoops or wires as lines of latitude, giving the shape and form of the globe, and arranged latitudinally on the inside of the opaque or transparent material of the globe, and adjustable, so that the globe can be expanded from the equator to the poles, or easily pressed or folded together for transportation.

A circular plate, C, with four apertures, D, for air to have free passage, is fastened to the polar ends of the globe, having bearings E in their centers, through which the illuminated axis A is inserted, and upon which the globe revolves.

F are circular supports for the globe.

The object of my invention is to enable lecturers to use either a terrestrial or celestial transparent globe at night, that the references may be easily seen by the audience or the pupils of day or night schools. The globes are to be delineated, so as to represent the most complete globes on an extensive scale, and yet to be manufactured as cheaply as possible, so that they can be easily transported and adapted to common school purposes.

What I claim as my invention, and desire to secure by Letters Patent, is—

The construction of a transparent or opaque globe, when arranged with adjustable wires and end plates, in combination with an illuminated axis, as herein described, and for the purposes set forth.

ELIAS BASCOM.

Witnesses:
J. FRANKLIN REIGART,
JOHN S. HOLLINGSHEAD.